UNITED STATES PATENT OFFICE.

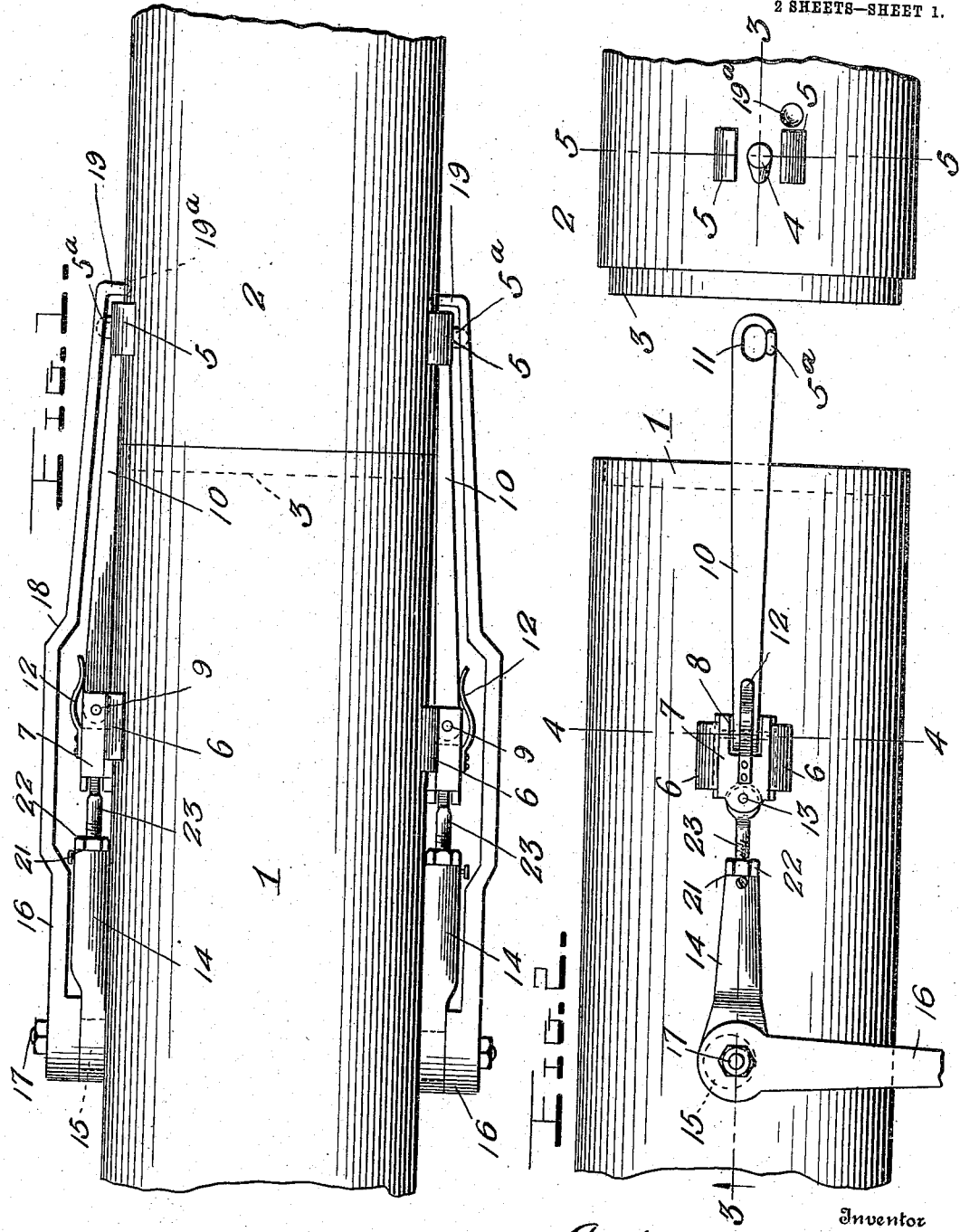

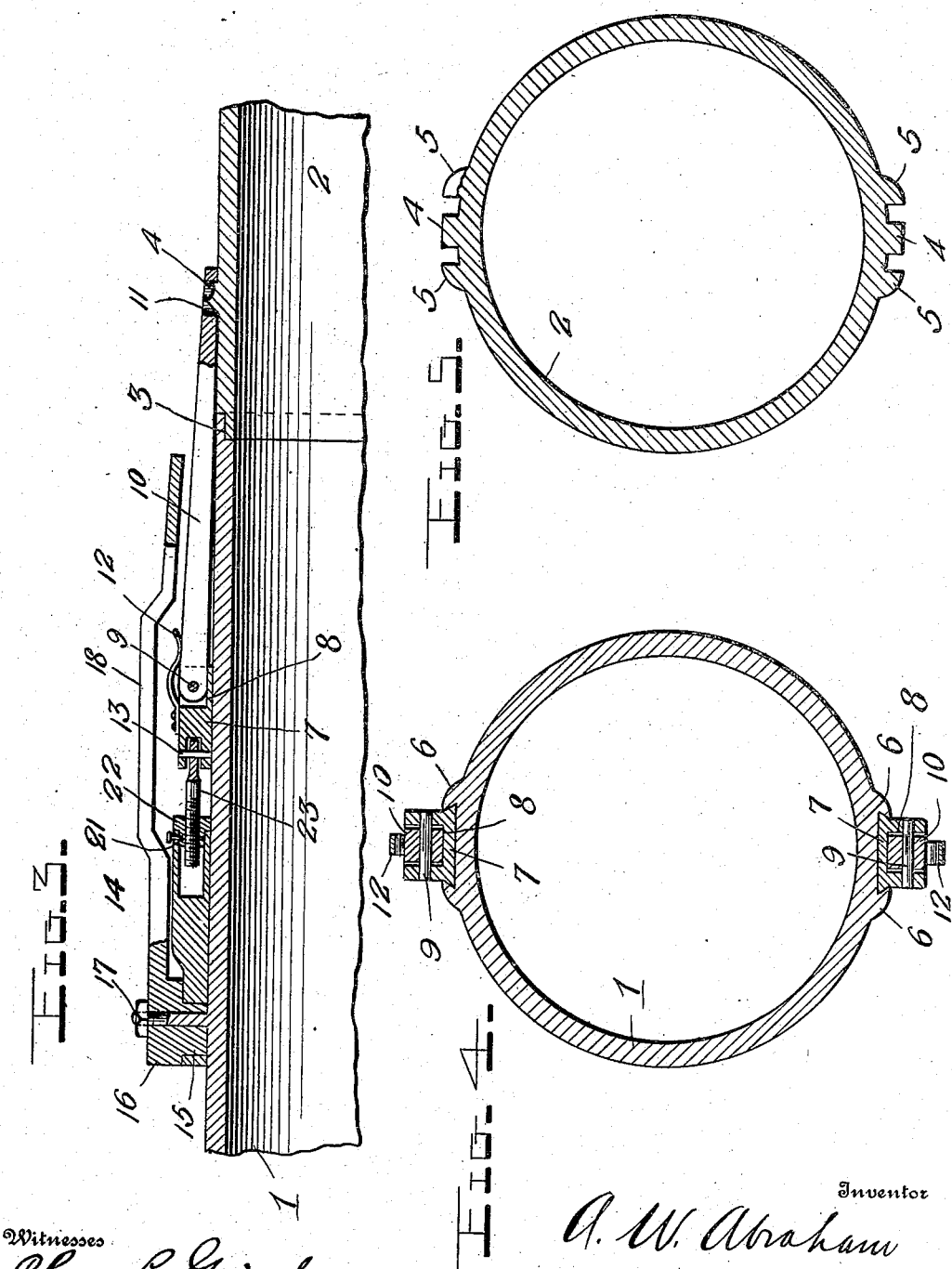

ALBERT W. ABRAHAM, OF OSHKOSH, WISCONSIN.

HOSE-COUPLING.

937,405.  Specification of Letters Patent.  Patented Oct. 19, 1909.

Application filed April 24, 1909. Serial No. 491,930.

*To all whom it may concern:*

Be it known that I, ALBERT W. ABRAHAM, a citizen of the United States, residing at Oshkosh, in the county of Winnebago and State of Wisconsin, have invented certain new and useful Improvements in Hose-Couplers, of which the following is a specification, reference being had to the accompanying drawings.

This invention relates to improvements in hose coupling devices of that class which permit two sections of a hose pipe or the like to be quickly connected or disconnected.

The object of the invention is to provide a coupling of this character which will be simple, strong and durable in construction, which will permit the parts to be quickly and easily connected or disconnected, and which will permit the parts to be adjusted to compensate for wear and to insure a fluid tight joint at the coupling.

With the above and other objects in view, the invention consists of the novel features of construction and the combination and arrangement of parts hereinafter fully described and claimed, and illustrated in the accompanying drawings, in which—

Figure 1 is a side elevation showing the improved hose coupler; Fig. 2 is a plan view of the coupling showing its members detached; Fig. 3 is a longitudinal section taken on the plane indicated by the line 3—3 in Fig. 2; and Figs. 4 and 5 are detail transverse sections taken on the planes indicated by the lines 4—4 and 5—5 in Fig. 2.

In the drawings 1 and 2 denote the two members or sections of the hose coupling, the inner ends of which have a suitable telescoping or interlocking connection which may be as indicated at 3 or of other form and construction and the outer ends of which are adapted to be suitably connected to the ends of two pipes, hose sections, or the like. Provided at diametrically opposite points on the outside of the member 2 are outwardly projecting pins 4 on the opposite sides of each of which are spaced guide and retaining studs 5. The pins 4 provide keepers to be engaged by co-acting connecting devices, hereinafter explained, carried by the member 1 and the studs or lugs 5 are adapted to retain said connecting devices on the keepers.

Provided at diametrically opposite points upon the outside of the member 1 are longitudinally extending channeled guide members 6 having undercut walls to receive slides 7. Pivoted in recesses 8 in the latter by means of transverse pins 9 are longitudinally extending connecting links 10, the free ends of which are formed with elongated openings or slots 11 to receive the pins 4 on the member 2, said slotted ends of the links 10 being adapted to lie between the spaced studs or lugs 5, which latter tend to prevent lateral movement of the links. The links 10 are pivoted at 9 to permit their slotted ends to be readily engaged with and disengaged from the pins 4 and to hold said links in engagement with the latter, leaf springs 12 are secured at one end upon the slides 7 and their free ends bearing against the outer faces of said links, as clearly shown in Fig. 2. Pivoted to the slides 7 by radially projecting pivots 13 are eccentric strap arms 14, the straps of which surround eccentric bosses 15 on levers 16 which are pivoted at 17 on the member 1. Said levers are adapted to swing longitudinally and the eccentric bosses or hubs 15 upon them are so disposed that when they are swung longitudinally of the members and over the links 1, they tend to draw the links inwardly for the purpose of drawing the member 2 toward the member 1. The intermediate portions of the levers 16 are provided with lateral offsets 18 to prevent them from contacting with the slides 7 and their free ends are provided with inwardly bent portions terminating in cams 19 which frictionally engage the member 2 at opposite points to retain said levers in locked position. The resiliency of the levers 16, together with the provision of the cams 19 at their free ends, insures the retention of the levers in locked position, but it will be understood that if desired, any other locking means may be provided for said levers. For instance, a recess or seat 19$^a$ may be provided in the member 2 to receive the bent or cam-shaped end 19 of the lever 18 and retain it in locked position. For the purpose of preventing the levers 16 from being swung over from one side to the other of the device, a stop lug 5$^a$ is provided upon each of the links 10 for engagement by said levers, as will be readily understood upon reference to the drawings. To permit of the adjustment of the parts to compensate for wear on the members 1, 2 and particularly at the joint or connection 3, the eccentric strap arms 14 are made longitudinally adjustable or extensible by forming each of them in two sections, namely, a tubular section 20 on which is swiveled, as shown at 21, a rotatable nut 22 for the reception of the screw threaded end of the other section 23, as clearly shown in Fig. 3 of the drawings. It will be seen that when the nut 22 is rotated the two sections 20, 23 of the eccentric strap arm will be moved into or out of each other and that by varying the length of said arms 14 the connecting links 10 may be caused to draw the two coupling members 1, 2 together to secure an effective contact at the joint when the levers 16 are in locked position.

From the foregoing it will be seen that the invention provides an exceedingly simple and practical device of this character which will permit two members or sections of a hose piece or the like to be quickly and easily connected or disconnected, and that the adjustment of the parts enables an effective joint to be maintained between the two members even after they have become considerably worn.

Having thus described the invention what is claimed is:

1. A hose coupler comprising two members, keeper pins upon one member, the last mentioned member being also formed with recesses, undercut guides upon the other member, slides engaged with said guides, spring pressed links pivoted in said slides, and having apertured outer ends for engagement with said keeper pins, levers having eccentrics, eccentric strap arms between said eccentrics and said slides, and transverse cams upon the extremities of said levers and adapted to swing over into the recesses in said member.

2. A hose coupler comprising two members, keepers upon one member, slides upon the other member, links carried by said slides for engagement with said keepers, levers having eccentrics, and two part eccentric strap arms between said eccentrics and said slides, the parts of said eccentric strap arms having a screw threaded engagement whereby said arms may be varied in length.

3. A hose coupling comprising two members, keepers upon one member, slides upon the other member, links carried by said slides for engagement with said keepers, levers having eccentrics and longitudinally adjustable eccentric strap arms between said eccentrics and said slides.

4. A hose coupling comprising two members, keepers upon one member, slides upon the other member, links carried by said slides for engagement with said keepers, levers provided with eccentrics, eccentric strap arms between said eccentrics and said slides and arms upon said levers for retaining them in locked position.

5. A hose coupling comprising two members, keepers upon one member, slides upon the other member, links carried by said slides for engagement with said keepers, levers provided with eccentrics, eccentric strap arms between said eccentrics and slides, stops upon said links to limit the swinging movement of said levers, and co-acting means upon one of the members and said levers for retaining the latter in locked position.

In testimony whereof I hereunto affix my signature in the presence of two witnesses.

ALBERT W. ABRAHAM.

Witnesses:
 HERMAN BEDUHN,
 E. A. BELOW.